(12) United States Patent
Takeuchi et al.

(10) Patent No.: US 8,675,263 B2
(45) Date of Patent: Mar. 18, 2014

(54) IMAGE READING APPARATUS

(75) Inventors: Masaru Takeuchi, Aichi (JP); Takayuki Akimatsu, Aichi (JP)

(73) Assignee: Brother Kogyo Kabushiki Kaisha, Nagoya-shi (JP)

(*) Notice: Subject to any disclaimer, the term of this patent is extended or adjusted under 35 U.S.C. 154(b) by 270 days.

(21) Appl. No.: 13/073,329

(22) Filed: Mar. 28, 2011

(65) Prior Publication Data

US 2011/0242618 A1    Oct. 6, 2011

(30) Foreign Application Priority Data

Mar. 30, 2010   (JP) ................................ 2010-078668

(51) Int. Cl.
- *H04N 1/04* (2006.01)
- *G06F 3/12* (2006.01)
- *H04N 1/21* (2006.01)
- *B41J 29/13* (2006.01)

(52) U.S. Cl.
USPC .......... 358/474; 358/1.13; 358/494; 358/496; 358/497; 358/498; 358/296; 347/108

(58) Field of Classification Search
USPC ........ 358/474, 1.13, 494, 496, 498, 296, 497; 347/108
See application file for complete search history.

(56) References Cited

U.S. PATENT DOCUMENTS

| | | | | |
|---|---|---|---|---|
| 7,688,482 | B2* | 3/2010 | Iwago | 358/496 |
| 2005/0157356 | A1* | 7/2005 | Horaguchi | 358/494 |
| 2006/0192833 | A1* | 8/2006 | Samoto et al. | 347/108 |
| 2007/0201100 | A1* | 8/2007 | Ikeno et al. | 358/296 |
| 2007/0236756 | A1* | 10/2007 | Yamaguchi | 358/498 |
| 2008/0180760 | A1* | 7/2008 | Andoh et al. | 358/497 |
| 2012/0147402 | A1* | 6/2012 | Tan | 358/1.13 |

FOREIGN PATENT DOCUMENTS

| | | |
|---|---|---|
| CN | 1703068 A | 11/2005 |
| CN | 1821888 A | 8/2006 |
| CN | 1892463 A | 1/2007 |
| JP | 01-147693 A | 6/1989 |
| JP | 2002-262038 | 9/2002 |
| JP | 2002-344691 A | 11/2002 |

(Continued)

OTHER PUBLICATIONS

Notification of Reasons of Rejection issued in corresponding Japanese Patent Application No. 2010-078668 mailed Sep. 11, 2012.

(Continued)

*Primary Examiner* — Charlotte M Baker
*Assistant Examiner* — Rury Grisham
(74) *Attorney, Agent, or Firm* — Banner & Witcoff, Ltd.

(57) ABSTRACT

An image reading apparatus to read an image formed on a document sheet is provided. The image reading apparatus includes a sheet conveyer and an image reader, which is controlled by a controller and reads the image formed on the document sheet. The sheet conveyer includes movable parts, which are movably supported by a first supporting member. The image reader is supported by a second supporting member, which is detachably attached to the first supporting member. A cable with a connector connects the controller and the image reader with each other via the connector. The second supporting member is tied to the first supporting member by the cable when the cable connects the controller and the image reader via the connector. The second supporting member is releasable from the first supporting member when the connector is decoupled.

7 Claims, 6 Drawing Sheets

(56) References Cited

FOREIGN PATENT DOCUMENTS

| JP | 2002-359724 A | 12/2002 |
|---|---|---|
| JP | 2003-250958 A | 9/2003 |
| JP | 2003-263242 A | 9/2003 |
| JP | 2004-154981 A | 6/2004 |
| JP | 2006-248119 A | 9/2006 |
| JP | 2009-227491A A | 10/2009 |
| JP | 2009-260476 A | 11/2009 |
| JP | 2009-267921 A | 11/2009 |
| JP | 2011-077840 A | 4/2011 |

OTHER PUBLICATIONS

JP Office Action dtd Feb. 7, 2012, JP Appln. 2010-078668, English translation.
Notice of Allowance issued in Japanese Counterpart Application No. 2010-078668 mailed Nov. 27, 2012.
First Office Action issued in corresponding Chinese Patent Application No. 201110088533.6 dated Jun. 18, 2013.

\* cited by examiner

IMAGE READING APPARATUS

CROSS REFERENCE TO RELATED APPLICATION

This application claims priority from Japanese Patent Application No. 2010-078668, filed on Mar. 30, 2010, the entire subject matter of which is incorporated herein by reference.

BACKGROUND

1. Technical Field

An aspect of the present invention relates to an image reading apparatus.

2. Related Art

An image reading apparatus having a contact image sensor (CIS) in an image reader unit is known. The CIS is generally arranged in a position along a document feeding path in the apparatus with a reading surface thereof facing the feeding path. Therefore, the CIS may be arranged on a frame of the apparatus with the other (non-reading) surface attached to the frame. When the CIS is installed in the apparatus, a worker may access the CIS through an opening, which is formed in the frame on a side opposite from the document feeding path across the CIS.

The opening may be formed in a position to be covered by internal components in the apparatus when the image reader unit is set in an operable closed position and exposed when the image reader unit is moved in an open position. Thus, when the image reader unit is in the open position, the worker can access the CIS through the exposed opening to install and remove the CIS in and from the image reading apparatus.

SUMMARY

Upon installation and removal of the CIS, if obstacles such as dust intrude and remain in a compartment for the CIS, light to be received by the CIS is interrupted by the obstacles, and the interruption may undesirably affect image-reading quality of the image reading apparatus. Therefore, in order to keep the obstacles out of the CIS, it is often required that the CIS is installed in and removed from the apparatus in a so-called clean booth.

Meanwhile, the image reading apparatus may tend to weigh a considerable amount; therefore, carrying the image reading apparatus for installation and removal of the CIS may impose burden on the worker. Further, when the image reading apparatus is set in the clean booth, movable space for the image reading unit, in addition to workspace to settle the apparatus, is required in the booth. In other words, considerably large workspace is required for the entire image reading apparatus in the clean booth.

Moreover, when the image forming unit accompanied by the entire image reading apparatus is brought in the clean booth, it is likely that dust adhered to various parts of the image reading apparatus may also accompany the image forming unit to be brought in the clean booth.

In view of the above difficulties, the present invention is advantageous in that an image reading apparatus, which may not be necessarily be brought entirely in the workspace for installation and removal of an image reading sensor, is provided. Further, the image reading apparatus may occupy smaller workspace for installation and removal of the image reader, and thereby a fewer obstacles may be brought in the obstacle-sensitive workspace.

According to an aspect of the present invention, an image reading apparatus to read an image formed on a document sheet is provided. The image reading apparatus includes a sheet conveyer, which is configured to convey the document sheet along a sheet feeding path, and an image reader, which is controlled by a controller and configured to read the image formed on the document sheet being conveyed in the sheet feeding path. The sheet conveyer includes movable parts, which are configured to be driven by a drive source and movably supported by a first supporting member. The image reader is supported by a second supporting member, which is detachably attached to the first supporting member. A cable with a connector is connected to the controller at one end and to the image reader at the other end to connect the controller and the image reader with each other via the connector. The second supporting member is tied to the first supporting member by the cable when the cable connects the controller and the image reader via the connector. The second supporting member is releasable from the first supporting member when the connector is decoupled.

BRIEF DESCRIPTION OF THE ACCOMPANYING DRAWINGS

DETAILED DESCRIPTION

Figure 1A:
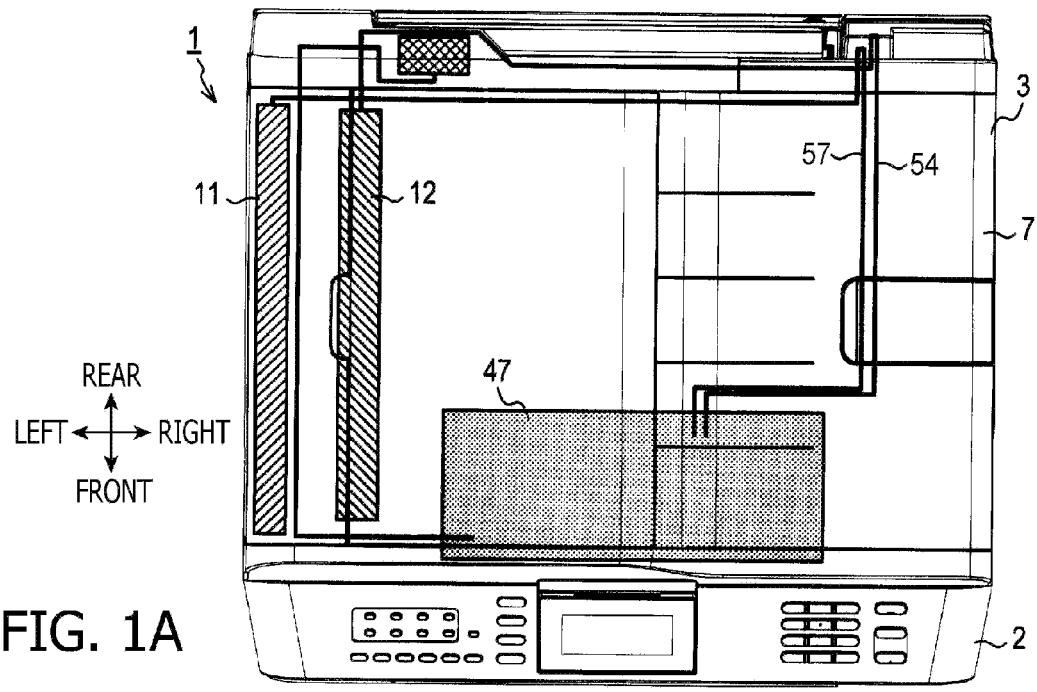
FIG. 1A is a top plane view of a multifunction peripheral (MFP) having an image reading apparatus according to an embodiment of the present invention.

Hereinafter, an embodiment of the present invention will be described with reference to the accompanying drawings. A multifunction peripheral device (MFP) 1 will represent an image reading device according to the present invention.

Overall Configuration of the MFP

The MFP 1 is equipped with a plurality of image processing functions, which include a scanning function, a printing function, a copier function, and a facsimile transmission/receiving function. In the present embodiment, directions concerning the MFP 1 will be referred to in accordance with orientation indicated by arrows in the drawings.

Figure 1B:
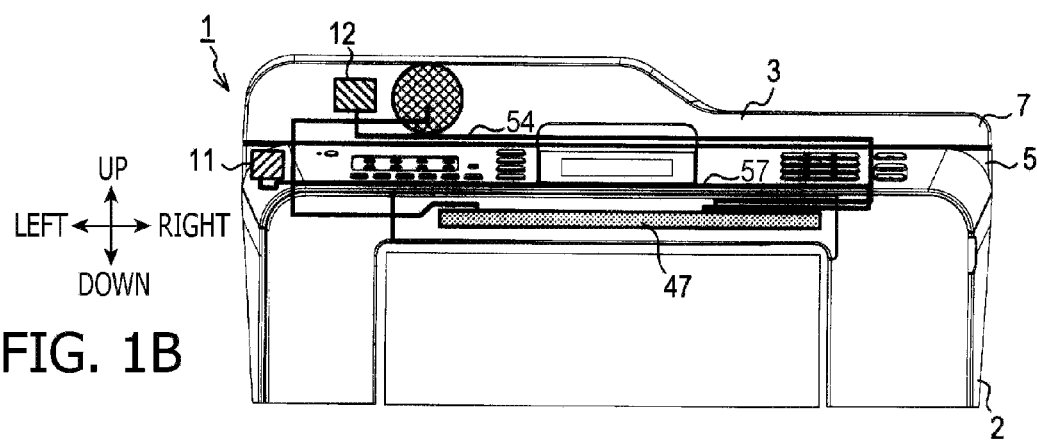
FIG. 1B is a front view of the MFP according to the embodiment of the present invention.

The MFP 1 includes a main unit 2 at a bottom and a scanner unit 3 on top of the main unit 2. The scanner unit 3 is rotatable about a lower rear edge thereof, which corresponds to an upper rear edge of the main unit 3, to be openable and closable with respect to the main unit 2. Thus, the scanner unit 3 can shift postures thereof between a closed position (see FIG. 1B) and an open position (not shown). When the scanner unit 3 is in the open position, a user can access an internal structure of the main unit 2 in order to, for example, repair parts in the main unit 2 and maintain operability of the main unit 2.

The scanner unit 3 includes a flatbed unit 5, on which a sheet of source document with an original image to be read can be set, and a cover unit 7, which covers a top of the flatbed unit 5. The cover unit 7 is rotatable about a rear edge thereof and can shift postures thereof between a closed position (see FIGS. 1A and 1B) and an open position (not shown) when a front part thereof is uplifted and lowered. Thus, when the cover unit 7 is in the open position, the sheet of source document can be placed between the flatbed unit 5 and the cover unit 7. Further, additionally to and separately from the rotating behavior, the cover unit 7 can shift positions thereof between a lower position (not shown) and an upper position (not shown). Therefore, a document with thickness (e.g., a book) can be placed steadily between the flatbed unit 5 and the cover unit 7.

Scanner Unit

Figure 2:
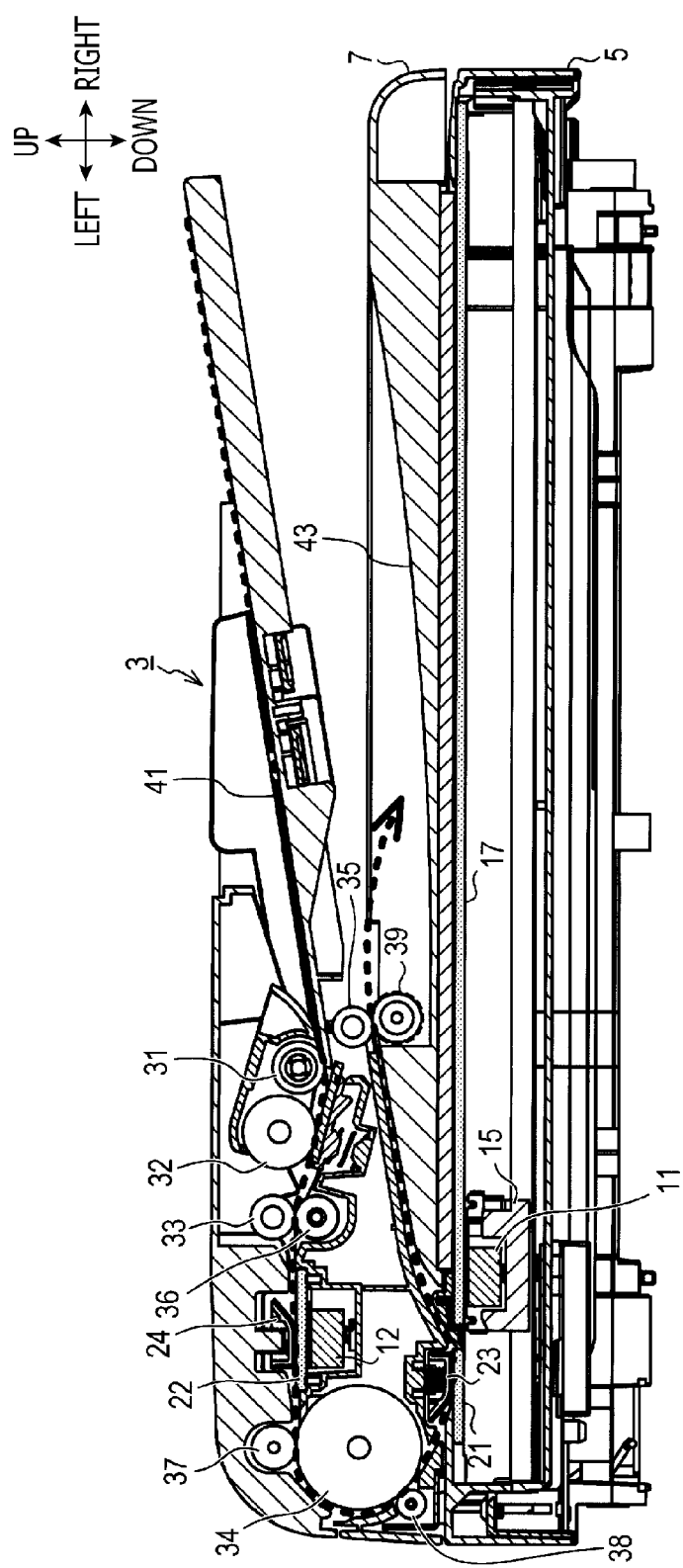
FIG. 2 is a cross-sectional front view of a scanner unit in the MFP according to the embodiment of the present invention.

The scanner unit 3 having a flatbed and an auto-document feeder (ADF) will be described hereinbelow in detail with reference to FIG. 2. The scanner unit 3 of the MFP 1 includes a first image sensor 11 and a second image sensor 12, which are contact image sensors (CIS) to optically read images from the document and converts the images into electric signals representing the images. Within the scanner unit 3, the first image sensor 11 is arranged in the flatbed unit 5, and the second image sensor 12 is arranged in the cover unit 7.

The first image sensor 11 extends linearly in parallel with the front-rear direction of the MFP 1 and is mounted on a carriage 15, which is reciprocated in the flatbed unit 5 along a right-left direction. In an upper position with respect to the reciprocating path of the carriage 15, a piece of flatbed glass 17 is arranged. When the carriage 15 is driven in the right-left direction, therefore, the first image sensor 11 is moved in the same direction along with the carriage 15 underneath the flatbed glass 17.

When the scanner unit 3 is used to serve as a flatbed scanner, the document sheet is placed on top of the flatbed glass 17. As the first image sensor 11 is moved in the right-left direction, a plurality of pixels aligned in lines perpendicularly to the right-left direction on the document sheet are scanned sequentially, and the image on the document sheet placed on the flatbed glass 17 is read. The read image is converted into electrical signals and transmitted through a cable 57 to a controller 47 in the main unit 2 to be processed.

In the present embodiment, the front-rear direction of the MFP 1 (see FIG. 1A) is also referred to as a main scanning direction, and the direction in which the carriage 15 with the first image sensor 11 is moved is referred to as an auxiliary direction. The main scanning direction and the auxiliary direction are perpendicular to each other.

Above the reciprocating path of the first image sensor 11 and a left-hand side of the flatbed glass 17, a first ADF glass 21 is arranged on a same plane as the flatbed glass 17. Further, a second ADF glass 22 is arranged on an upper position with respect to the second image sensor 12. In an upper position with respect to the first ADF glass 21, a first presser piece 23 is arranged, and a second presser piece 24 is arranged in an upper position with respect to the second ADF glass 22.

The scanner unit 3 is provided with a plurality of rollers, which are driven by a driving source (not shown) to convey the document sheet in a sheet feeding path, in the cover unit 7. The rollers include a feed roller 31, a separator roller 32, an intermediate conveyer roller 33, a main conveyer roller 34, and a discharge roller 35. Further, a first nip roller 36, a second and third nip rollers 37, 38, and a fourth nip roller 39, which work in cooperation with the intermediate conveyer roller 33, the main conveyer roller 34, and the discharge roller 35 respectively, are arranged in positions opposite from the co-working rollers 33-35. The sheet feeding path is indicated by a thick broken arrow in FIG. 2.

When the scanner unit 3 is used to serve as an ADF-typed image scanner, the rollers 31-39 are driven, and the document sheet placed on a document holder 41 is fed in the sheet feeding path. In particular, sheets in the source document placed on the document holder 41 are picked up by the feed roller 31 to be conveyed downstream in the feeding path and separated from each other by the separator roller 32. The separated sheets are carried by the intermediate conveyer roller 33 to the main conveyer roller 34 one-by-one and turned around along an outer periphery of the main conveyer roller 34. The sheets are further conveyed by the main conveyer roller 34 to the discharge roller 35, which conveys the sheets downstream to be ejected out of the sheet feeding path. The ejected sheets are settled in the discharge tray 43.

When the scanner unit 3 serves as the ADF-typed image scanner, moreover, the first image sensor 11 is moved to a position below the first presser piece 23 and stopped thereat. Meanwhile, the second image sensor 12 is fixed to a position below the second presser piece 24 and is not movable in the right-left direction from the position.

As the document sheet is conveyed in the sheet feeding path in a section between the intermediate conveyer roller 33 and the main conveyer roller 34, the document sheet is carried in clearance between the second ADF glass 22 and the second presser piece 24. In this regard, as the document sheet is moved in the auxiliary direction whilst the second image sensor 12 is fixed in the position, a plurality of pixels aligned in lines perpendicularly to the auxiliary direction on a back side of the sheet are scanned sequentially, and the image formed on the back side of the sheet is read.

As the document sheet is further conveyed in the sheet feeding path in a section between the main conveyer roller 34 and the discharge roller 35, the document sheet is carried in clearance between the first ADF glass 21 and the first presser piece 23. In this regard, as the document sheet is moved in the auxiliary direction whilst the first image sensor 11 is fixed in the position, a plurality of pixels aligned in lines perpendicularly to the auxiliary direction on a front side of the sheet are scanned sequentially, and the image formed on the front side of the sheet is read. The read image is converted into electrical signals and transmitted through the cable 57 to the controller 47 in the main unit 2 to be processed.

[Configuration of Components Surrounding the Second Image Sensor]

Figure 3:
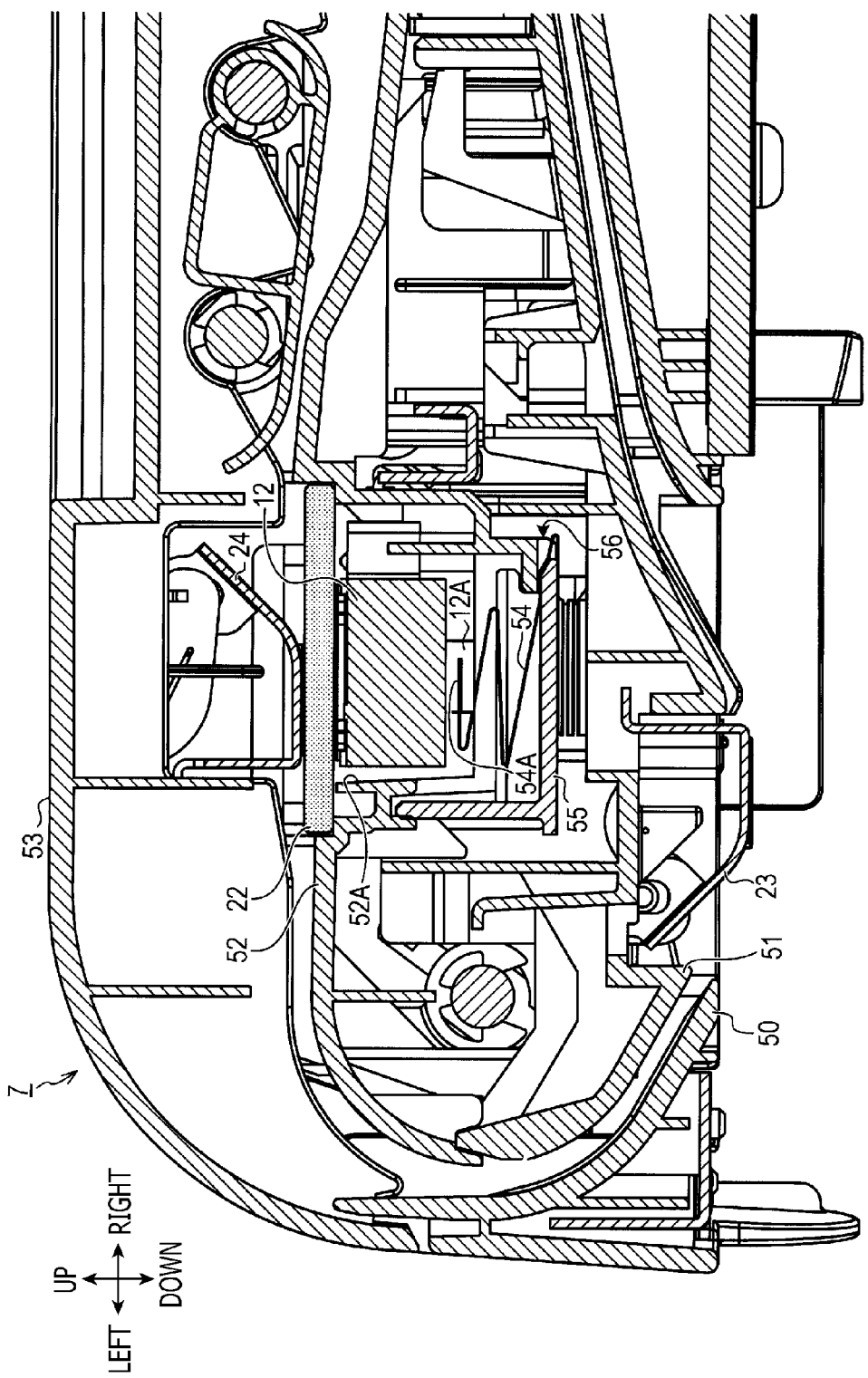
FIG. 3 is a cross-sectional partial view of a second image sensor and neighboring components in the scanner unit in the MFP according to the embodiment of the present invention.

Next, components surrounding the second image sensor 12 in the cover unit 7 will be described with reference to FIGS. 3-5.

The cover unit 7 includes an ADF base 50, a first frame 51, a second frame 52, and an ADF cover 53. The first frame 51 is attached to the ADF base 50 and is a supporting piece to support movable parts in the cover unit 7 such as the main conveyer roller 34. As seen in FIG. 3, the ADF base 50 and the first frame 51 are formed to have curvature in the cross-sections and arranged to have clearance there-between; an upper surface of the ADF base 50 and a lower surface of the frame 51 are arranged in positions to be apart from each other. Thus, the upper surface of the ADF base 50 and the lower surface of the frame 51 define a part of the sheet feeding path, which directs the document sheet around the main conveyer roller 34 to the discharge roller 35.

The second frame 52 is a supporting piece to support components including the second image sensor 12. The second frame 52 and the ADF cover 53 are formed to have curvature at least partially in the cross-sections and arranged to have clearance there-between; an upper surface of the second frame 52 and a lower surface of the ADF cover 53 are arranged in positions to be apart from each other. Thus, the upper surface of the second frame and the lower surface of the ADF cover define a part of the sheet feeding path, which guides the document sheet from the intermediate conveyer roller 33 to the main conveyer roller 34.

The second frame 52 also serves to cover the movable parts supported by the first frame 51 so that the movable parts are prevented from being exposed to the document sheet conveyed in the sheet feeding path between the ADF cover 53 and the second frame 52. More specifically, the second frame 52 is formed in a shape to allow exposure of contacting movable parts (e.g., the main conveyer roller 34), which are to become in contact with the document sheet, to the document sheet and to restrict the other movable parts surrounding the contacting movable parts from becoming in contact with the document sheet.

The second frame 52 supports the second ADF glass 22, which is fitted in the second frame 52 to cover a sensor compartment 52A. The sensor compartment 52A accommodates the second image sensor 12 in the position underneath the second ADF glass 22. Thus, the second image sensor 12 can read the image on the document sheet passing over the second image sensor 12 through the second ADF glass 22. Further, the second ADF glass 22 seals the sensor compartment 52A and prevents intrusion of obstacles in the sensor compartment 52A so that the second image sensor 12 is prevented from becoming in contact with the obstacles.

Further, a flexible flat cable (FFC) 54 is arranged in a lower position with respect to the second image sensor 12. The FFC 54 connects the second image sensor 12 and the controller 47 in the main unit 2.

In order for the FFC 54 to be connectible with the second image sensor 12, the FFC 54 and the second image sensor 12 have paired connectors, which are, for example, a receptacle and a plug. The second image sensor 12 may have the receptacle whilst the FFC 54 may have the plug, and vice versa. In the present embodiment, however, the connector in the second image sensor 12 will be referred to as a connector 12A, and the connector in the FC 54 will be referred to as a connector 54A. The connector 12A is provided on a lower side of the second image sensor 12, and the connector 54A of the FFC 54 can be coupled to the connector 12A. Thus, the second image sensor 12 and the FFC 54 can be electrically connected. When the FFC 54 connects the second image sensor 12 with the controller 47, therefore, the second frame 52 including the second image sensor 12 is tied to the second frame 51 having the controller 47.

Further, a cover 55 is arranged to cover a lower opening of the sensor compartment 52A. When the cover 55 is set in the lower position of the sensor compartment 52A to cover the lower opening, clearance 56 is reserved between the first frame 51 and the second frame 52, and the FFC 54 is directed in the sensor compartment 52A through the clearance 56.

Figure 4:
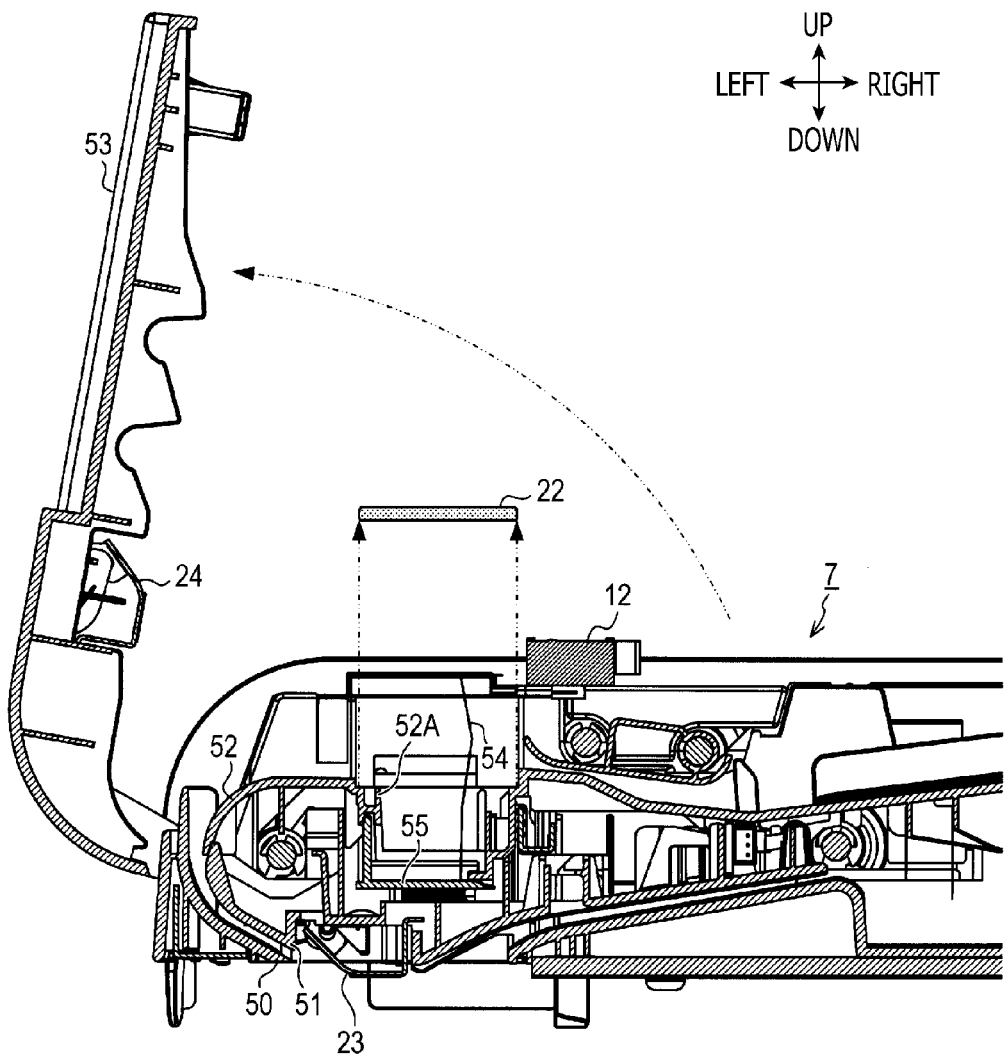
FIG. 4 is a cross-sectional side view of a second frame with the second image sensor detached from a first frame in the MFP according to the embodiment of the present invention.
Figure 5A:
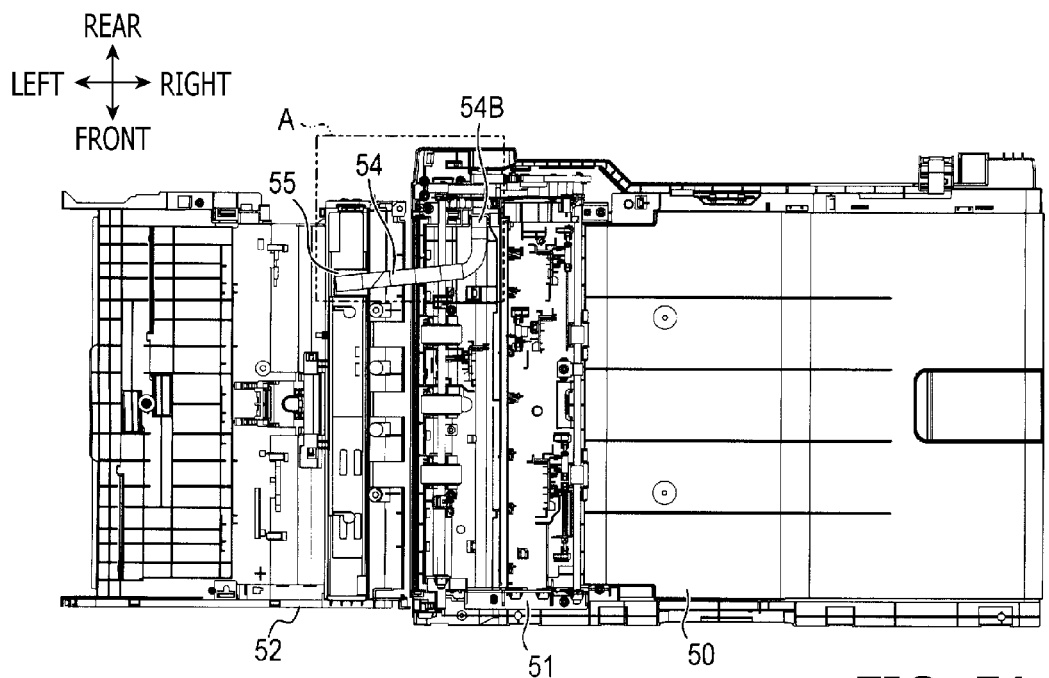
FIG. 5A is a plane view of the MFP according to the embodiment of the present invention with the second frame being open.
Figure 5B:
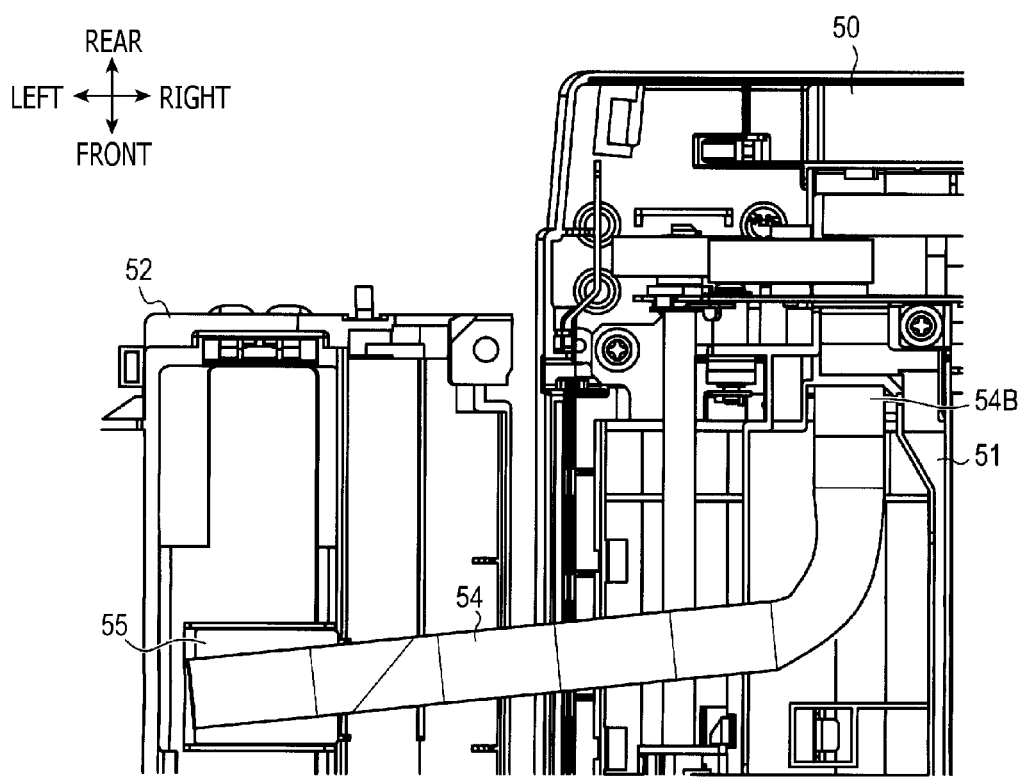
FIG. 5B is an enlarged view of a section A shown in FIG. 5B.

The ADF cover 53 is rotatable about a lower-left end thereof to be open to expose the upper surface of the second frame 52 (see FIG. 4). With the ADF cover 53 being open, when the second ADF glass 22 is removed, a user can access the second image sensor 12 to remove from the sensor compartment 52A.

The FFC 54 is folded alternately in accordion in a section between the first image sensor 12 and the cover 55. Therefore, when the second image sensor 12 is removed from the sensor compartment 52A, the accordion-foldable section is unfolded to extend linearly, and the second image sensor 12 can be easily taken out of the sensor compartment 52A without pulling a lower section of the FFC 54 outward.

The second frame 52 is detachable from the first frame 51 (see FIGS. 5A and 5B), and the FFC 54 is also accordion-folded in a section between the first frame 51 and the second frame 52. Therefore, when the second frame 52 is detached from the first frame 51, the accordion-foldable section of the FFC 54 is unfolded to extend linearly, and the second frame 52 and the first frame 51 can be placed side by side on a same plane. In this regard, the FFC 54 should have substantial length to allow the side-by-side placement of the second frame 52. Thus, even when the second frame 52 is detached from the first frame 51, the second frame 52 is connected to the ADF base 50 and the first frame 51 via the FFC connector 54 as long as the connector 12A and the connector 54A are interlocked.

With the second frame 52 detached from the first frame 51, when the cover 55 is removed, the interlocked connector 12A and the connector 54 are exposed to be accessed by the user. Thus, the user can decouple the connecter 54 from the connector 12A when the second frame 52 needs to be completely disconnected from the first frame 51 and couple the connecter 54 back to the connector 12A when the second frame 52 is attached back to the first frame 51.

[Effects]

According to the MFP 1 as described above, a manufacture worker can install the second image sensor 12 in the sensor compartment 52A in the second frame 52 and attach the cover 55 to the second frame 52 to seal the sensor compartment 52A inside a clean booth. Once the sensor compartment 52A is sealed, the second image sensor 12 is protected from obstacles; therefore, the second frame 52 with the sealed second image sensor 12 can be securely taken out of the clean booth. When the connector 54A of the FFC 54 is coupled to the connector 12A of the second image sensor 12, the cover 55 may be removed to expose the connector 12A. In this regard, an opening covered by the cover 55 is smaller than a size of an opening covered by the second ADF glass 22. Therefore, without the cover 55, a risk to allow the obstacles in the sensor compartment 52A is lowered. Accordingly, the process to connect the FFC 54 with the second image sensor 12 may take place outside the clean booth, along a production line in the manufacturing site.

Further, when the second image sensor 12 is inspected or repaired, the second frame 52 including the second image sensor 12 can be released from the first frame 51 and carried in the clean booth. In this regard, removal of the second ADF glass 22 is not necessary, but the cover 55 may be removed from the second frame 52, and the FFC 54 may be disconnected from the second image sensor 12 outside the clean booth. Once the connector 54A of the FFC 54 is decoupled from the connector 12A of the second image sensor 12, the second image sensor 12 along with the second frame 52 can be released from the first frame 51 and brought in the clean booth to be exposed securely. Therefore, it is not necessary to bring the entire MFP 1 in the clean booth in order to expose the second image sensor 12.

Thus, the worker is not necessarily required to carry the entire burden of the MFP 1 in the workspace, and the workspace to be occupied for the work can be reduced. Further, an amount of accompanying dust, which may be brought in the workspace along with the remaining parts in the MFP 1 other than the second image sensor 12 and the second frame 52 can be reduced.

Meanwhile, the entire MFP 1 or the cover unit 7 including the first frame 51, the second frame 52, and the second image sensor 12 may be carried in the workplace to expose the second image sensor 12 therein. In such a case, the second image sensor 12 can be easily removed out of the sensor compartment 52A, after the second ADF glass 22 is removed, with the accordion-foldable FFC 54 being unfolded to extend linearly.

Further, with the partially accordion-folded installation of the FFC 54 outside the sensor compartment 52A, the second frame 52 can be detached from the first frame 51 whilst the connection between the FFC 54 and the second image sensor 12 is maintained. Thus, components attached to the first frame 51 can be easily and securely examined or repaired without removing the cover 55 or without allowing obstacles in the sensor compartment 52A even outside the clean booth.

MORE EXAMPLES

Although an example of carrying out the invention has been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

Figure 6A:
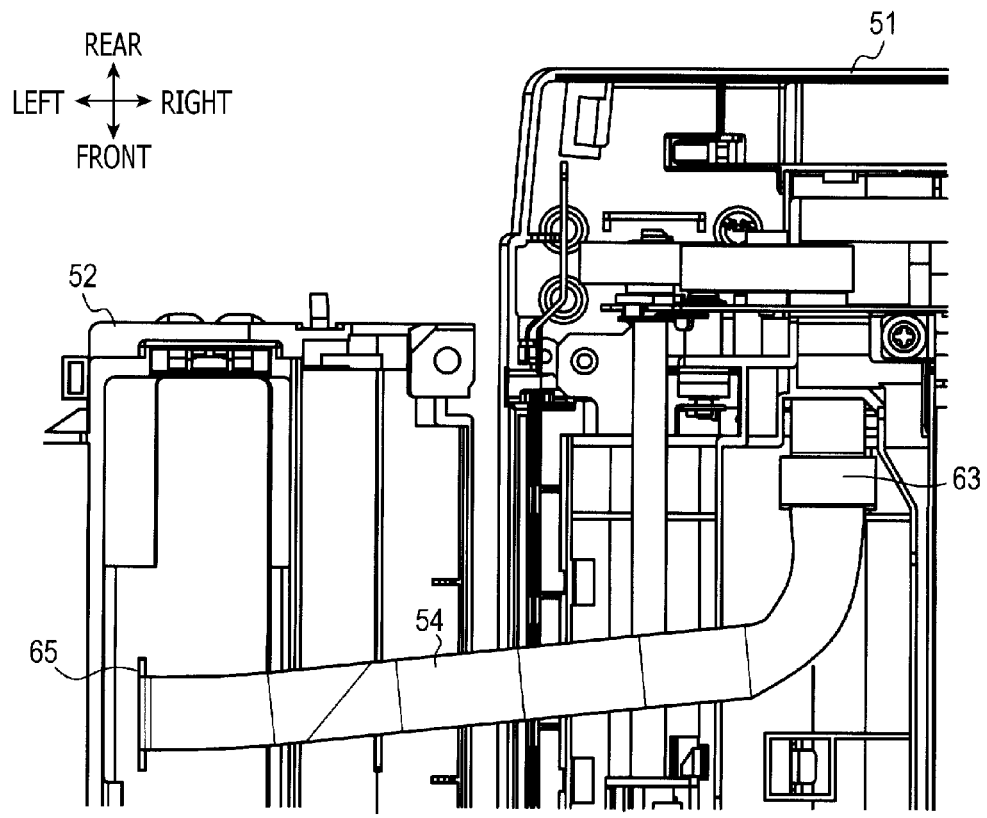
FIG. 6A is a plane partial view of the second frame detached from the first frame in the MFP according to a different example of the present invention.

For example, the connecting point for the connector 12A and the connector 54A may not necessarily be arranged inside the sensor compartment 52A but may be arranged outside the second frame 52. In FIG. 6A, a connecting point 63, in which the second image sensor 12 is connected to the FFC 54, is shown. The FFC 54 can be separated into two sections: a section connected to the second image sensor 12 and a section connected to the controller 47 at the connecting point 63. When the connecting point 63 is outside the second frame 52, the second image sensor 12 in the sensor compartment 52A can be free from dust whilst the FFC 54 is coupled to and decoupled from the second image sensor 12 at the connecting point 63.

Figure 6B:
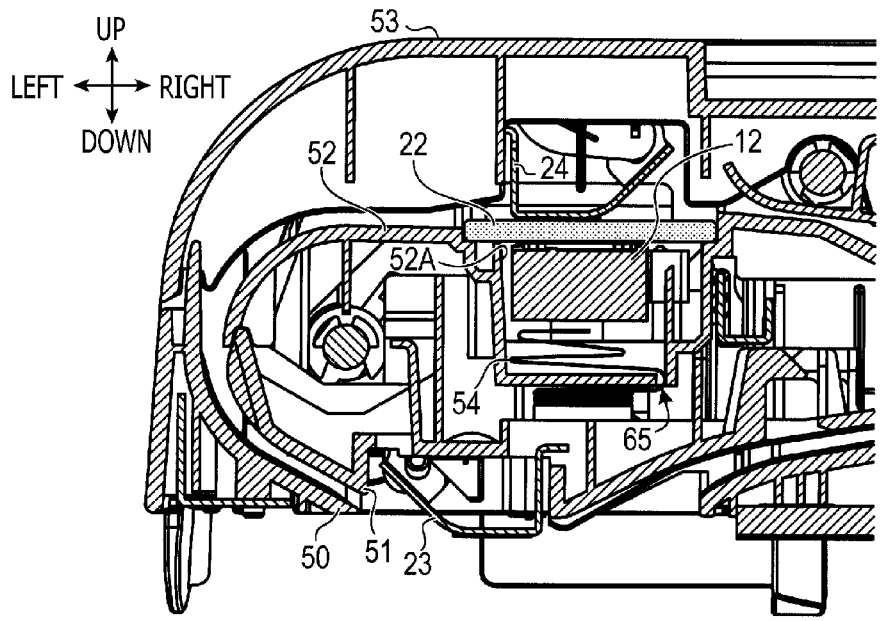
FIG. 6B is a cross-sectional partial view of the scanner unit in the MFP according to another different example of the present invention.

Further, when the connecting point 63 is arranged outside the second frame 52, the cover 55 may not necessarily be provided. Therefore, as shown in FIGS. 6A and 6B, the second frame 52 may be formed to have a slit 65, through which the FFC 54 is directed outside the sensor compartment 52A.

For another example, the scanner unit 3 to read the image may not necessarily be included in the MFP 1, but may be configured to be a single independent scanning device.

What is claimed is:

1. An image reading apparatus to read an image formed on a document sheet, comprising:
    a sheet conveyer, which is configured to convey the document sheet along a sheet feeding path; and
    an image reader, which is controlled by a controller and configured to read the image formed on the document sheet being conveyed in the sheet feeding path,
    wherein the sheet conveyer includes movable parts, which are configured to be driven by a drive source and movably supported by a first supporting member;
    wherein the image reader is supported by a second supporting member, which is detachably attached to the first supporting member;
    wherein a cable with a connector is connected to the controller at one end and to the image reader at the other end to connect the controller and the image reader with each other via the connector;
    wherein the second supporting member is tied to the first supporting member by the cable when the cable connects the controller and the image reader via the connector; and
    wherein the second supporting member is detachable free from the first supporting member when the connector is decoupled.

2. The image reading apparatus according to claim 1,
    wherein the second supporting member is formed to comprise internal space, in which intrusion of obstacles is restricted, and in which the image reader is arranged;
    wherein the cable is directed in the internal space through an opening formed in the second supporting member to be connected to the image reader at the other end thereof via the connector, which is to be coupled to a paired connector of the image reader;
    wherein the opening is provided with a covering to cover the internal space;
    wherein the paired connector of the image reader is accessible to be coupled with the connector of the cable when the opening is uncovered; and
    wherein clearance to direct the cable there-through is reserved in the opening when the covering is in a position to cover the internal space.

3. The image reading apparatus according to claim 1,
    wherein the connector is arranged in an intermediate position between the one end and the other end of the cable;
    wherein the cable is separated into a section connected to the image reader and a section connected to the controller when the connector of the cable is decoupled from the paired connector of the image reader.

4. The image reading apparatus according to claim 1,
    wherein the cable is configured to have a length, which allows the second supporting member detached from the first supporting member to be placed on a same plane as the first supporting member, whilst the connector remains coupled and the cable maintains connection between the image reader and the controller.

5. The image reading apparatus according to claim 1,
    wherein the second supporting member attached to the first supporting member allows exposure of contacting parts of the movable parts, which are to become in contact with the document sheet, to the document sheet, restricts the other movable parts surrounding the contacting parts from becoming in contact with the document sheet, and guides the document sheet along an upper surface thereof.

6. The image reading apparatus according to claim 5,
    wherein the second supporting member supports a piece of platen glass, which is fitted in the second supporting member to become in contact with the document sheet being conveyed;
    wherein the second supporting member is formed to comprise internal space to be covered by the platen glass; and
    wherein the image reader is arranged in the internal space covered by the platen glass to read the image formed on the document sheet through the platen glass.

7. An image reading apparatus to read an image formed on a document sheet, comprising:
    a cover unit including:
        a sheet conveyer, which is configured to convey the document sheet along a sheet feeding path, the sheet conveyer including movable parts, which are configured to be driven by a drive source and movably supported by a first supporting member; and
        a first image reader, which is controlled by a controller and configured to read the image formed on the document sheet being conveyed in the sheet feeding path, the first image reader being supported by a second supporting member, which is detachably attached to the first supporting member;

a cable with a connector, the cable being connected to the controller at one end and to the first image reader at the other end to connect the controller and the first image reader with each other via the connector; and a flatbed unit including a second image reader, wherein the second supporting member is tied to the first supporting member by the cable when the cable connects the controller and the first image reader via the connector, wherein the second supporting member is detachable from the first supporting member when the connector is decoupled.

* * * * *